United States Patent
Park et al.

(10) Patent No.: US 11,984,793 B2
(45) Date of Patent: May 14, 2024

(54) SPEED REDUCTION DEVICE FOR MOTOR

(71) Applicants: Hyundai Transys Inc., Seosan-si (KR); MARS Co., Ltd., Hwaseong-si (KR)

(72) Inventors: Hee Jun Park, Hwaseong-si (KR); Byung Mo Kim, Suwon-si (KR); Woo Kyo Jang, Seoul (KR); Chang Hee Jang, Hwaseong-si (KR); Jun Ho Shin, Seoul (KR)

(73) Assignees: HYUNDAI TRANSYS INC., Seosan-si (KR); MARS CO., LTD., Hwaseong-si (KR)

( * ) Notice: Subject to any disclaimer, the term of this patent is extended or adjusted under 35 U.S.C. 154(b) by 0 days.

(21) Appl. No.: 18/117,710

(22) Filed: Mar. 6, 2023

(65) Prior Publication Data
US 2023/0307990 A1    Sep. 28, 2023

(30) Foreign Application Priority Data

Mar. 25, 2022   (KR) .......................... 10-2022-0037669

(51) Int. Cl.
| | |
|---|---|
| *H02K 11/00* | (2016.01) |
| *B60N 2/02* | (2006.01) |
| *H02K 7/116* | (2006.01) |

(52) U.S. Cl.
CPC ....... *H02K 7/1166* (2013.01); *B60N 2/02246* (2023.08); *B60N 2/02253* (2023.08)

(58) Field of Classification Search
CPC ... F16H 1/32; F16H 2001/325; H02K 7/1166; B60N 2/02246; B60N 2/02253; B60N 2/1857; A47C 7/02
See application file for complete search history.

(56) References Cited

U.S. PATENT DOCUMENTS

| | | | | |
|---|---|---|---|---|
| 2023/0078759 A1* | 3/2023 | Maruo | ................. | B60N 2/1615 |
| | | | | 297/344.17 |
| 2023/0081857 A1* | 3/2023 | Sakai | ..................... | F16H 35/00 |
| | | | | 74/424.5 |

FOREIGN PATENT DOCUMENTS

| | | | | |
|---|---|---|---|---|
| CN | 112513498 A | * | 3/2021 | ............... F16H 1/32 |
| DE | 112019003566 T5 | * | 3/2021 | ............... F16H 1/32 |
| JP | 2020016332 A | * | 1/2020 | ............... F16H 1/32 |

(Continued)

OTHER PUBLICATIONS

Request for the Submission of an Opinion in Korean App. No. 10-2022-0037669 dated Jan. 3, 2024.

*Primary Examiner* — Zakaria Elahmadi

(74) *Attorney, Agent, or Firm* — Quantum Patent Law Firm; Seongyoune Kang

(57) ABSTRACT

Disclosed is a speed reduction device for a vehicle motor. The speed reduction device includes an output gear connected to an output shaft of the motor, a transmission gear engaged with the output gear, a cam formed to be integrated with the transmission gear, a cycloid inner gear, a pair of wedges compressed against the inner peripheral surface of a through hole of the cycloid inner gear by elastic restoring force of a spring and configured to closely contact the cam, a ring gear partially engaged with the cycloid inner gear when the cycloid inner gear is eccentrically rotated, an end plate, and a final output gear configured to finally output rotational force of the cycloid inner gear, thereby preventing backlash between gears during rotational driving of the motor and reliably preventing movement of a seat after swivel adjustment is completed.

13 Claims, 6 Drawing Sheets

(56) References Cited

FOREIGN PATENT DOCUMENTS

| JP | 2020133863 A | * | 8/2020 | ............... G02B 7/32 |
| --- | --- | --- | --- | --- |
| JP | 2020133863 A | | 8/2020 | |
| KR | 10-2017-0141334 A | | 12/2017 | |
| KR | 10-1816680 B1 | | 1/2018 | |
| WO | WO-2020013131 A1 | * | 1/2020 | ............... F16H 1/32 |
| WO | WO-2022230302 A1 | * | 11/2022 | ............... F16H 1/32 |

* cited by examiner

SPEED REDUCTION DEVICE FOR MOTOR

CROSS-REFERENCE TO RELATED APPLICATION

This application, under 35 U.S.C. § 119(a), claims priority to Korean Patent Application No. 10-2022-0037669, filed on Mar. 25, 2022, the entire contents of which are incorporated herein by reference.

BACKGROUND

(a) Technical Field

The present disclosure relates to a speed reduction device for a motor. More particularly, it relates to a speed reduction device for a vehicle motor capable of reliably preventing seat movement after adjustment of a seat swivel by preventing play and backlash between speed reduction gears and components provided in the speed reduction device for the motor.

(b) Background Art

Generally, a vehicle seat includes a seat cushion configured to allow an occupant to be seated thereon, a seatback configured to support the back of an occupant, a headrest configured to support the neck and head of an occupant, and the like. Furthermore, various seat position adjustment mechanisms are applied to the seat to enable the seat position to be freely adjusted depending on the body shape or situation of an occupant.

Recently, in preparation for launch of an autonomous vehicle, research and development has been performed on a seat including various seat position adjustment mechanisms for conversation and meeting between occupants, relaxation and sleeping, and assistance in entering and exiting the vehicle.

For example, various seat position adjustment mechanisms described above include a seat swivel mechanism, a seat height adjustment mechanism, and a mechanism configured to implement a relaxation comfort posture.

Particularly, in order to support multilateral meetings and conversations, external scenery viewing, assistance in entering and exiting the vehicle, and the like, the seat swivel mechanism has been developed as a structure capable of rotating the angle of a seat by 180° or more in a desired direction.

Meanwhile, a motor including a speed reduction device may be necessarily used as an actuator configured to drive the seat swivel mechanism, and the speed reduction device includes various gear combinations in order to increase rotational torque of the motor and is connected to an output shaft of the motor.

As an example of the speed reduction device configured to increase rotational torque of the motor, a speed reduction device in which a plurality of speed reduction gears including planetary gears are combined is used.

Accordingly, the seat swivel mechanism may be operated through various processes including a process of outputting rotational force of the motor to a plurality of speed reduction gears including planetary gears of a speed reduction device, a process of increasing rotational torque of the motor in the speed reduction gears of the speed reduction device, and a process of transmitting rotational force to an input shaft or an input gear of the swivel mechanism through an output gear in the speed reduction device. In this manner, the seat may be rotated according to operation of the seat swivel mechanism.

However, as a speed reduction device for a motor required for the seat swivel mechanism, in the case of using a speed reduction device in which a plurality of speed reduction gears including planetary gears are combined, backlash occurs due to play in a meshing portion between the plurality of speed reduction gears including the planetary gears. Due to this backlash, there is a problem in that movement of the seat occurs during swiveling operation of the seat.

More specifically, when and after rotational force of the motor is transmitted to the seat swivel mechanism through the plurality of speed reduction gears including the planetary gears and the output gear in the speed reduction device, and the swivel operation of the seat is completed, external force (for example, back drive as rotational load) may be reversely input to the plurality of speed reduction gears including the planetary gears through the output gear. In this case, due to backlash between the respective speed reduction gears, the seat moves in the swivel direction, and an occupant seated on the seat may feel uncomfortable due to this unexpected movement of the seat.

In addition, as described above, when the external force (for example, back drive as rotational load) is reversely input to the plurality of speed reduction gears including the planetary gears through the output gear, impact between respective gear teeth caused by backlash may not only reduce strength of the gear, but also cause damage to the gear, and the impact caused by the backlash is transmitted to a worm gear connected to an output shaft of the motor, which may lead to damage to the motor.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a speed reduction device for a vehicle motor, including an output gear connected to an output shaft of the motor, a transmission gear engaged with the output gear, a cam formed to be integrated with the transmission gear, a cycloid inner gear, a pair of wedges pressed against the inner peripheral surface of a through hole of the cycloid inner gear by elastic restoring force of a spring and configured to closely contact the cam, a ring gear partially engaged with the cycloid inner gear when the cycloid inner gear is eccentrically rotated, and an end plate and a final output gear configured to finally output rotational force of the cycloid inner gear, thereby making it possible to prevent occurrence of play and backlash between gears and components during rotational driving of the motor. Accordingly, it is possible to reliably prevent shaking or movement of a seat after swivel adjustment is completed.

Furthermore, in the speed reduction device according to the present disclosure, even if external force (for example, back drive as rotational load) is reversely input to the end plate through the final output gear, rotation of the end plate is primarily prevented by support force of rotational force transmission pins of the cycloid inner gear, and even if external force is reversely input to the end plate through the final output gear and then transmitted to the cycloid inner gear, a pair of wedges secondarily acts as brake force to block rotation of the cycloid inner gear, thereby fundamentally preventing external force from being transmitted to a worm wheel gear serving as a transmission gear and a worm gear serving as an output gear. Accordingly, it is possible to prevent damage to the worm wheel gear and the worm gear.

In one aspect, the present disclosure provides a speed reduction device for a motor, including a transmission gear engaged with an output gear of a motor and disposed in a speed-reducing housing, a cam having a pair of rotational force transmission protrusions formed to protrude from an outer surface thereof, the cam being integrally mounted on an outer surface of the transmission gear, a ring gear mounted on an outer surface of the housing, a cycloid inner gear having a through hole formed in a center portion thereof and a plurality of rotational force transmission pins formed on an outer surface thereof, the cycloid inner gear being partially engaged with the ring gear while being eccentric with respect to the transmission gear, a pair of wedges disposed in close contact with an inner peripheral surface of the through hole so as to respectively contact the pair of rotational force transmission protrusions entering the through hole, a spring configured to compress the pair of wedges against the inner peripheral surface of the through hole with elastic restoring force, a rotational support shaft having an inner end configured to pass through a rotational center portion of the transmission gear and the cam, the inner end being rotatably engaged with the housing, and an outer end configured to eccentrically pass through the through hole and formed to extend in the outward direction, and an end plate having a plurality of restraining holes formed therein and configured to allow the plurality of rotational force transmission pins to be respectively inserted thereinto so as to enable power transmission, the end plate being rotatably inserted into the rotational support shaft.

In a preferred embodiment, the output gear of the motor may be embodied as a worm gear connected to an output shaft of the motor and located in the speeding-reducing housing, and the transmission gear may be embodied as a worm wheel gear engaged with the worm gear.

In another preferred embodiment, the spring may have a broken-shape ring portion supported by the transmission gear and elastic support ends respectively bent outwards or in axial directions from opposite ends of the ring portion, the elastic support ends respectively compressing the pair of wedges against the inner peripheral surface of the through hole of the cycloid inner gear with the elastic restoring force.

In still another preferred embodiment, the transmission gear may have a support jaw formed on an outer surface thereof, wherein the support jaw may allow the ring portion of the spring to be wound therearound and supported thereby.

In yet another preferred embodiment, the wedges may have restraining grooves respectively formed at opposite one ends thereof and configured to face each other so that the elastic support ends may be respectively inserted into the restraining grooves and restrained therein, and each of the wedges may gradually become thinner toward the other end thereof.

In still yet another preferred embodiment, the transmission gear, the cam, and the end plate may be coaxially arranged by the rotational support shaft, and the cycloid inner gear may be engaged with the ring gear while the pair of wedges is in contact with and supported by the pair of rotational force transmission protrusions of the cam so as to be arranged eccentrically with respect to the transmission gear, the cam, and the end plate.

In a further preferred embodiment, the plurality of rotational force transmission pins may be integrally formed on an outer surface of the cycloid inner gear and spaced apart by circumferentially equal distances around the cycloid inner gear, the plurality of restraining holes may be formed to penetrate the end plate and are spaced apart by circumferentially equal distances around the end plate, and an inner diameter of each of the restraining holes may be formed to be larger than a cross-sectional diameter of each of the rotational force transmission pins of the cycloid inner gear.

In another further preferred embodiment, when the rotational force transmission pins of the cycloid inner gear are respectively inserted into the restraining holes of the end plate, some of the rotational force transmission pins may be respectively in close contact with the inner peripheral surfaces of corresponding ones of the restraining holes in a direction of restraining clockwise rotation of the end plate, and the rest of the rotational force transmission pins may be respectively in close contact with the inner peripheral surfaces of corresponding ones of the restraining holes in a direction of restraining counterclockwise rotation of the end plate.

In still another further preferred embodiment, the speed reduction device may further include a housing cover having an output hole formed therein and configured to allow the final output gear to protrude to an outside of the housing cover, the housing cover being fastened to the speed-reducing housing with the ring gear interposed therebetween.

Other aspects and preferred embodiments of the device are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles powered by both gasoline and electricity.

The above and other features of the device are discussed infra.

BRIEF DESCRIPTION OF THE DRAWINGS

The above and other features of the present device will now be described in detail with reference to certain exemplary embodiments thereof illustrated in the accompanying drawings which are given hereinbelow by way of illustration only, and thus are not limitative of the present disclosure, and wherein.

Figure 1:
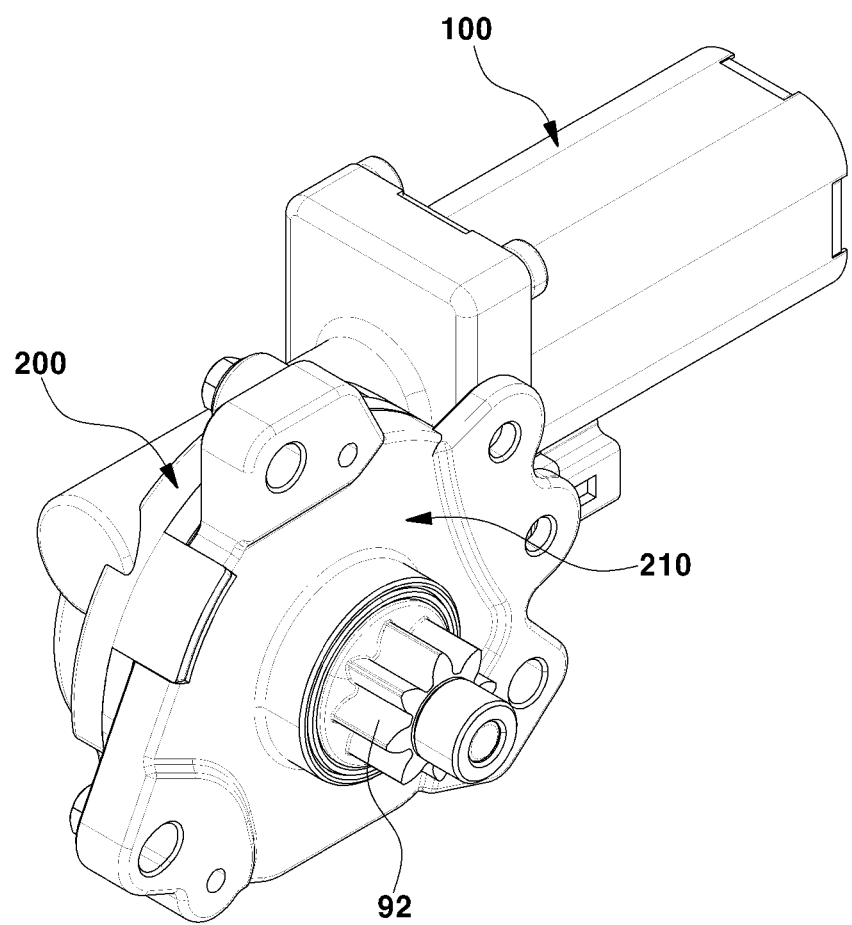
FIG. 1 is an external perspective view showing an assembled state of a speed reduction device for a motor according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present device, examples of which are illustrated in the accompanying drawings and described below. While the device will be described in conjunction with exemplary embodiments, it will be understood that present description is not intended to limit the device to the exemplary embodiments. On the contrary, the disclosure is intended to cover not only the exemplary embodiments, but also various alternatives, modifications, equivalents and other embodiments, which may be included within the spirit and scope of the device as defined by the appended claims.

Figure 2:
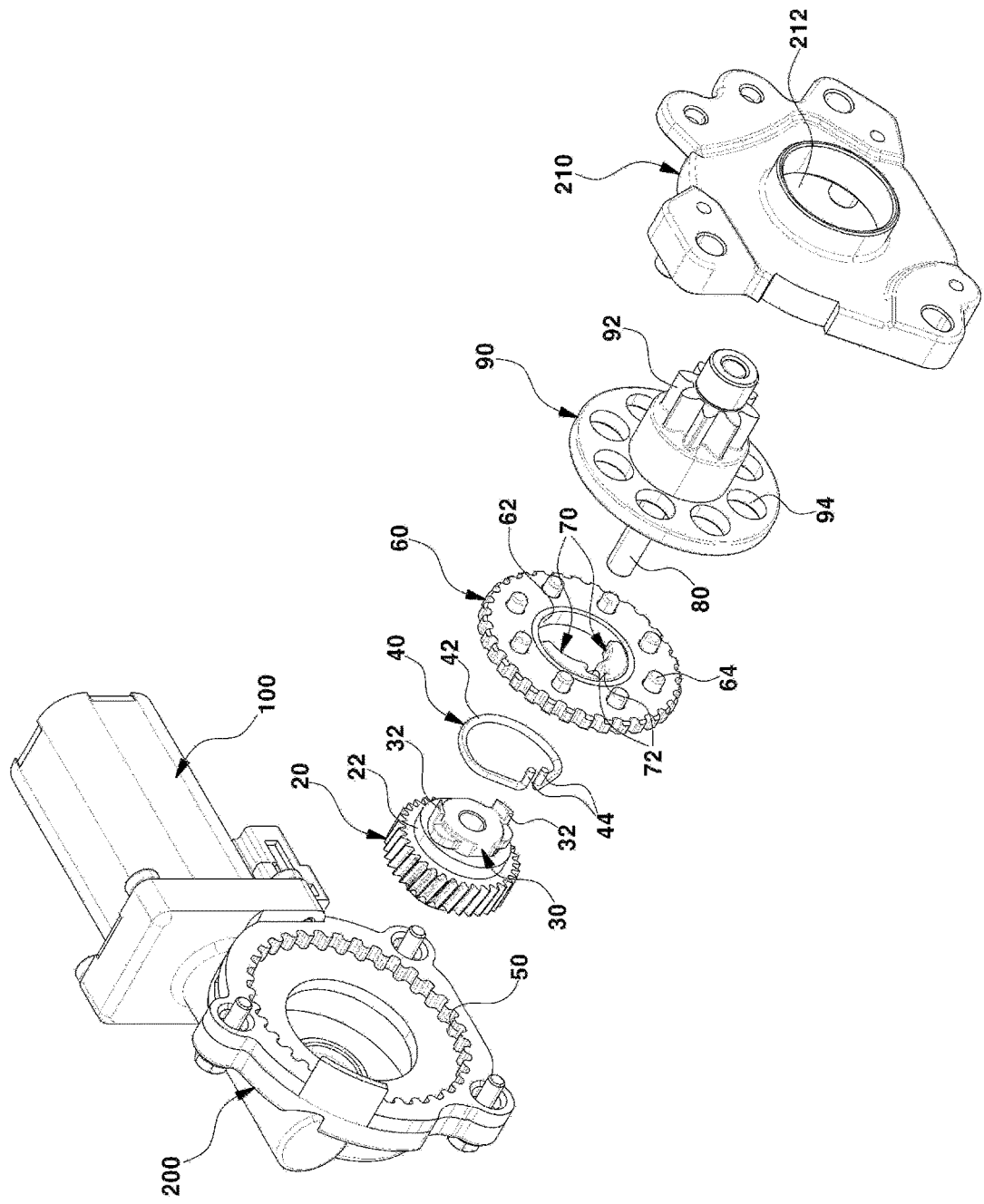
FIGS. 2 and 3 are exploded perspective views showing the speed reduction device for the motor according to the present disclosure.
Figure 3:
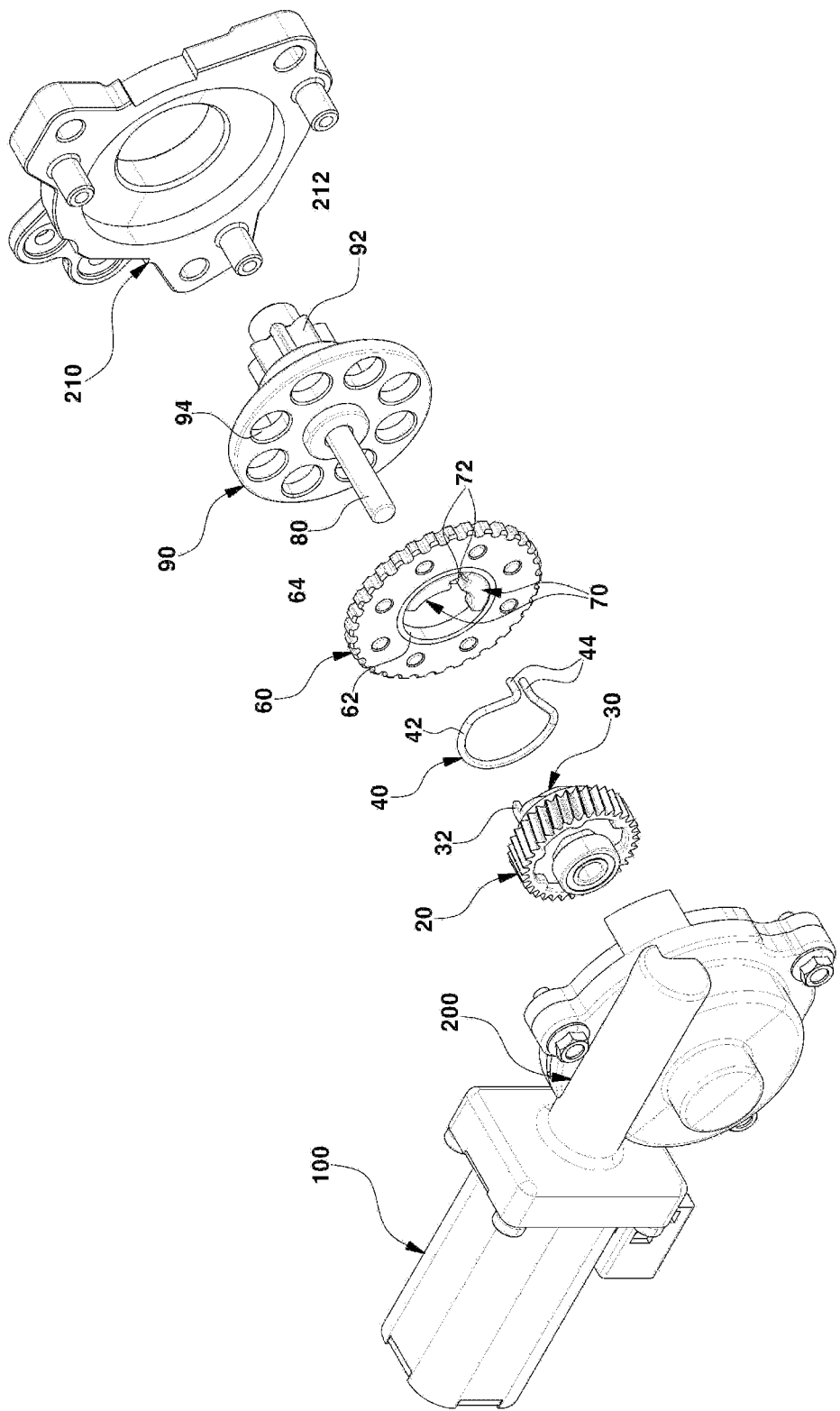
Figure 4:
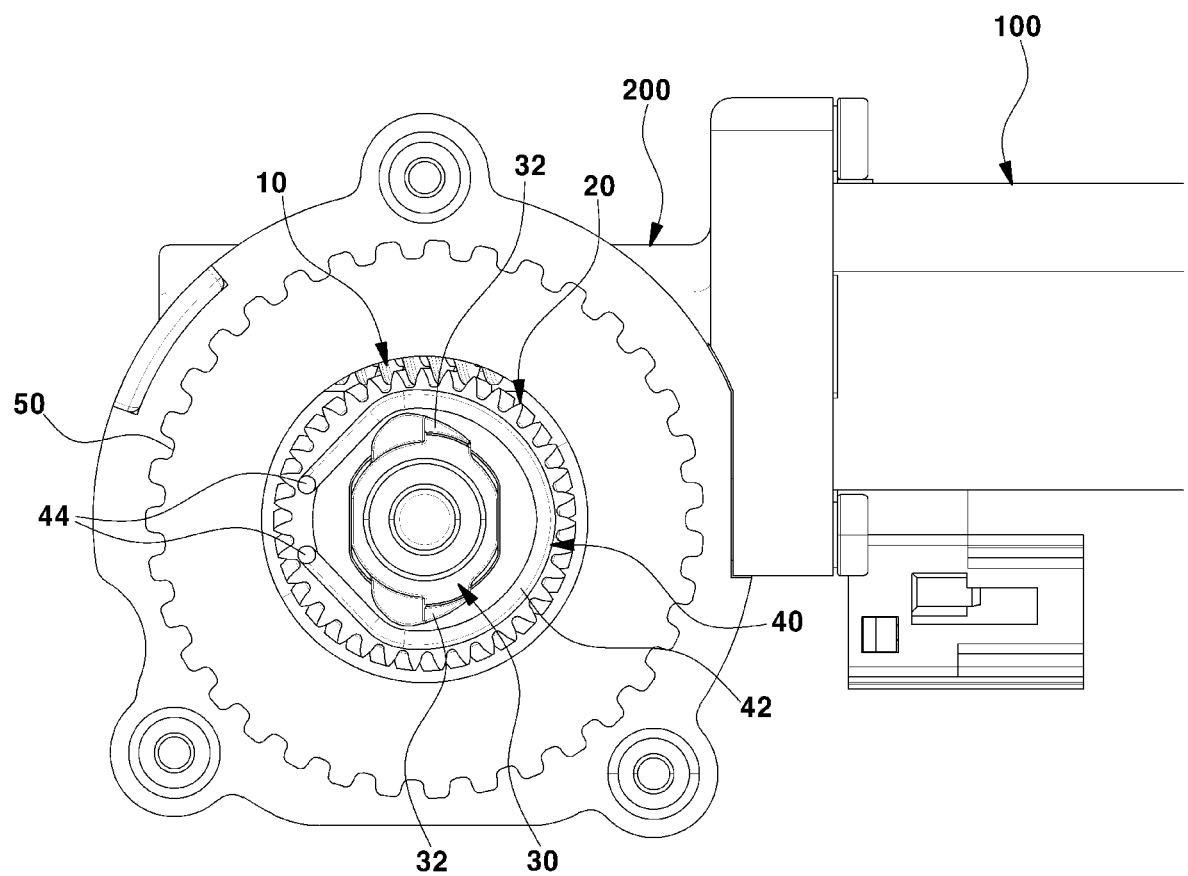
FIG. 4 is a front view showing a state in which a worm wheel gear serving as a power transmission gear and a cam of the speed reduction device for the motor according to the present disclosure are assembled.

FIG. 1 is an external perspective view showing an assembled state of a speed reduction device for a motor according to the present disclosure, FIGS. 2 and 3 are exploded perspective views showing the speed reduction device for the motor according to the present disclosure, and FIG. 4 is a front view showing a state in which a worm wheel gear serving as a power transmission gear and a cam of the speed reduction device for the motor according to the present disclosure are assembled. Here, reference numeral 100 in each drawing represents a motor.

A speed-reducing housing 200 is assembled to an output part of the motor 100.

As shown in FIG. 4, an output shaft of the motor 100 is connected to a worm gear 10 embodied as an output gear and rotatably located in the speed-reducing housing 200.

In addition, a worm wheel gear 20 embodied as a transmission gear is engaged with the worm gear 10 of the motor 100 and is rotatably positioned in the speed-reducing housing 200.

Preferably, a support jaw 22 having a circular protrusion shape is formed on the outer surface of the worm wheel gear 20 embodied as the transmission gear so that a spring 40 is wound around the support jaw 22 and supported thereby.

In this case, a ring gear 50 internally engaged with a cycloid inner gear 60 is mounted on the open outer surface of the speed-reducing housing 200.

A cam 30 is integrally mounted on the outer surface of the worm wheel gear 20 embodied as the transmission gear, and the cam 30 is integrally formed with a pair of rotational force transmission protrusions 32 protruding outwards or in axial directions from the outer periphery of the cam 30.

Desirably, the spring 40 includes a ring portion 42 having a broken shape, the ring portion 42 being wound around and supported by the support jaw 22 of the worm wheel gear 20, and a pair of elastic support ends 44 bent outwards or in axial directions from opposite ends of the ring portion 42.

Particularly, the cycloid inner gear 60 formed to be eccentric with respect to the worm wheel gear 20 is rotatably engaged with the ring gear 50.

More specifically, a through hole 62 is formed in the center of the cycloid inner gear 60, and a plurality of rotational force transmission pins 64 are spaced apart by circumferentially equal distances on the outer surface of the cycloid inner gear 60. Further, the cycloid inner gear 60 is rotated while the same is eccentric with respect to the worm wheel gear 20 embodied as the transmission gear and is partially engaged with the ring gear 50.

In addition, a pair of wedges 70 is disposed in close contact with the inner peripheral surface of the through hole 62 of the cycloid inner gear 60.

Figure 5:
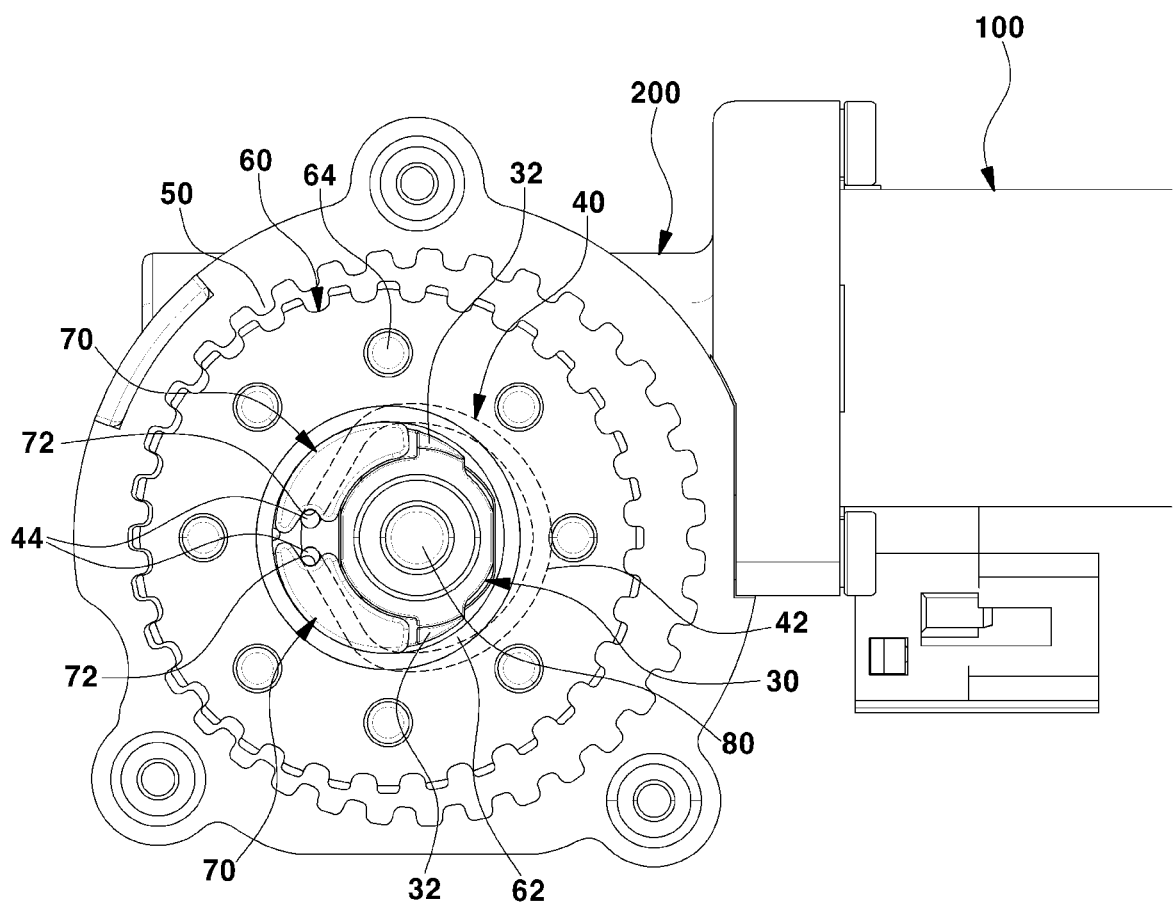
FIG. 5 is a front view showing a state in which a cycloid inner gear and a wedge of the speed reduction device for the motor according to the present disclosure are assembled.

Preferably, as shown in FIG. 5, the wedges 70 have restraining grooves 72 respectively formed at opposite one ends thereof and configured to face each other so that the elastic support ends 44 of the spring 40 are respectively inserted into the restraining grooves 72 and restrained therein, and each of the wedges 70 gradually becomes thinner toward the other end thereof.

Accordingly, when the elastic support ends 44 of the spring 40 are respectively inserted into the restraining grooves 72 of the wedges 70, as shown in FIG. 5, elastic restoring force of the spring 40 causes the elastic support ends 44 to respectively compress the wedges 70 against the inner peripheral surface of the through hole 62 of the cycloid inner gear 60.

Here, the pair of rotational force transmission protrusions 32 formed on the cam 30 is inserted into the through hole 62 of the cycloid inner gear 60, and is arranged in a contactable state so as to push the other end of each wedge 70 in the circumferential direction.

Meanwhile, the inner end of a rotational support shaft 80 passes through the center of rotation of the worm wheel gear 20 embodied as the transmission gear and the cam 30, and is rotatably engaged with the inner wall surface of the speed-reducing housing 200 with a bearing or the like interposed therebetween. Further, the outer end of the rotational support shaft 80 eccentrically passes through the through hole 62 of the cycloid inner gear 60 and extends in the outward direction to pass through the center of rotation of an end plate 90.

Accordingly, the worm wheel gear 20, the cam 30, and the end plate 90 are coaxially and rotatably supported on the rotational support shaft 80.

More specifically, the worm wheel gear 20 embodied as the transmission gear, the cam 30, and the end plate 90 are coaxially arranged by the rotational support shaft 80, and the cycloid inner gear 60 is engaged with the ring gear 50 while the two wedges 70 respectively contact the rotational force transmission protrusions 32 of the cam 30 and are supported thereby. Further, the cycloid inner gear 60 is arranged eccentrically with respect to the worm wheel gear 20, the cam 30, and the end plate 90.

Particularly, the end plate 90 has a plurality of restraining holes 94 formed and spaced apart by circumferentially equal distances around the end plate 90 and configured to allow the rotational force transmission pins 64 of the cycloid inner gear 60 to be respectively inserted thereinto so as to transmit rotational power. Further, the end plate 90 has a final output gear 92 mounted on the outer surface thereof, and the center portion of the final output gear 92 is rotatably inserted into and supported by the rotational support shaft 80.

Preferably, the rotational force transmission pins 64 of the cycloid inner gear 60 are integrally formed on the outer surface of the cycloid inner gear 60 and are spaced part by circumferentially equal distances around the cycloid inner gear 60, and the restraining holes 94 of the end plate 90 are formed to penetrate the end plate 90 and are spaced apart by circumferentially equal distances around the end plate 90. Here, the inner diameter of each of the restraining holes 94 is larger than the cross-sectional diameter of each of the rotational force transmission pins 64.

Figure 6:
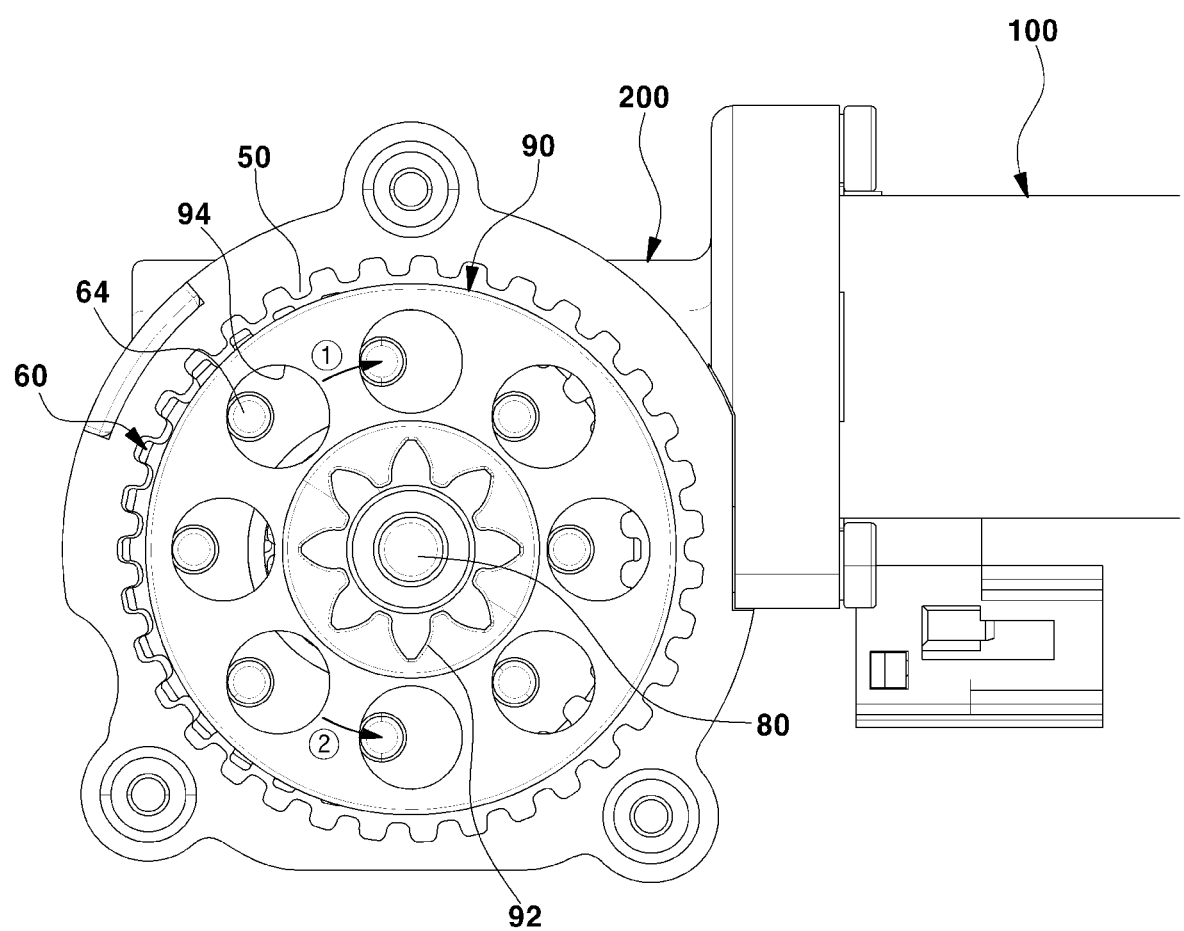
FIG. 6 is a front view showing a state in which rotational force transmission pins of the cycloid inner gear of the speed reduction device for the motor according to the present disclosure are respectively inserted into restraining holes of an end plate.

Accordingly, when each of the rotational force transmission pins 64 of the cycloid inner gear 60 is inserted into a corresponding one of the restraining holes 94 of the end plate 90, as shown in FIG. 6, some of the rotational force transmission pins 64 are respectively in close contact with the inner peripheral surfaces of the corresponding restraining holes 94 in the direction of restraining the clockwise rotation of the end plate 90 by external force, and the rest of the rotational force transmission pins 64 are respectively in close contact with the inner peripheral surfaces of the corresponding restriction holes 94 in the direction of restraining the counterclockwise rotation of the end plate 90 by external force.

Meanwhile, a housing cover 210 is fastened to the speed-reducing housing 200 with the ring gear 50 interposed therebetween, and the same may have an output hole 212 formed therein and configured to allow the final output gear 92 to protrude to an outside of the housing cover 210.

Hereinafter, a description will be given as to an operation flow of the speed reduction device for the motor having the above-described configuration.

First, when the motor 100 is driven, the worm gear 10, which is an output gear connected to the output shaft of the motor, is rotated.

Subsequently, since the worm gear 10 is in the state of being engaged with the worm wheel gear 20 serving as a transmission gear, rotational force of the worm gear 10 is transmitted to the worm wheel gear 20 so that the worm wheel gear 20 is rotated in one direction.

In addition, since the cam 30 is in the state of being mounted on the outer surface of the worm wheel gear 20, the cam 30 is also rotated in one direction.

Next, when the cam 30 is rotated in one direction, one of the pair of rotational force transmission protrusions 32 protruding outwards or in axial directions from the outer periphery of the cam 30 pushes the wedge 70 in the rotational direction, and the wedge 70 is eccentrically rotated with respect to the center of the worm wheel gear 20 and the cam 30.

Simultaneously, since the wedge 70 is compressed against the inner peripheral surface of the through hole 62 of the cycloid inner gear 60 by elastic restoring force of the spring 40, the cycloid inner gear 60 and the wedge 70 are eccentric with the center of the worm wheel gear 20 and the cam 30, and the cycloid inner gear 60 is eccentrically rotated while being partially engaged with the ring gear 50.

In this case, since each of the rotational force transmission pins 64 of the cycloid inner gear 60 is closely inserted into a corresponding one of the inner peripheral surfaces of the restraining holes 94 formed in the end plate 90, as shown in FIG. 6, rotational force of the cycloid inner gear 60 may be transmitted to the end plate 90 by the rotational force transmission pins 64.

That is, when the cycloid inner gear 60 is eccentrically rotated while being partially engaged with the ring gear 50, the rotational force transmission pins 64 transmit rotational force to the end plate 90 while being respectively rotated along the inner peripheral surfaces of the restraining holes 94 of the end plate 90.

Accordingly, since the end plate 90 is coaxially arranged with the worm wheel gear 20 and the cam 30 by the rotational support shaft 80, the same is rotated around the rotational support shaft 80.

Simultaneously, when the end plate 90 is rotated, the final output gear 92 mounted on the outer surface of the end plate 90 is also rotated.

Therefore, rotational force of the final output gear 92 may be finally output to a swivel mechanism of a vehicle seat, and as such, the seat may be rotated according to operation of the seat swivel mechanism.

For reference, the final output gear 92 may be connected to an input shaft or an input gear of the swivel mechanism (not shown) of the vehicle seat.

In this manner, the pair of wedges 70 is constantly compressed against the inner peripheral surface of the cycloid inner gear 60 while being constantly opened by the elastic restoring force of the spring 40, and each of the rotational force transmission pins 64 of the cycloid inner gear 60 is closely inserted into a corresponding one of the inner peripheral surfaces of the restraining holes 94 formed in the end plate 90, thereby making it possible to reliably prevent play and backlash between gears and components during rotation of the motor.

In addition, even if external force is input to the speed reduction device through the final output gear 92 after seat swivel operation is performed, it is possible to reliably prevent movement of the seat in the swivel-controlled state because there is neither play nor backlash between gears and components. As a result, it is possible to solve the conventional problem that an occupant seated on the seat feels uncomfortable due to unexpected shaking or movement of the seat due to play and backlash.

Meanwhile, even if external force is input to the end plate 90 through the final output gear 92 in a state in which the seat swivel operation ends and driving of the motor 100 is stopped, it is possible to fundamentally prevent external force from being transmitted to a worm wheel gear serving as a transmission gear and a worm gear serving as an output gear.

Further, as shown in FIG. 6, some of the rotational force transmission pins 64 of the cycloid inner gear 60 are respectively in close contact with and supported by the inner peripheral surfaces of the corresponding restraining holes 94 in the direction of restraining clockwise rotation of the end plate 90 (refer to an arrow indicated by ① in FIG. 6), and the rest of the rotational force transmission pins 64 are respectively in close contact with and supported by the inner peripheral surfaces of the corresponding restraining holes 94 in the direction of restraining counterclockwise rotation of the end plate 90 (refer to an arrow indicated by ② in FIG. 6). Accordingly, for example, even if external force (for example, back drive as rotational load) is reversely input to the end plate 90 through the final output gear 92, the end plate 90 is restrained so as not to be rotated by support force of the rotational force transmission pins 64.

In this manner, some of the rotational force transmission pins 64 of the cycloid inner gear 60 restrain clockwise rotation of the end plate 90, and the rest of the rotational force transmission pins 64 restrain counterclockwise rotation of the end plate 90, thereby making it possible to primarily prevent external force from being transmitted to a cam gear, a worm wheel gear serving as a transmission gear, and a worm gear serving as an output gear. Accordingly, it is possible to prevent damage to the worm wheel gear and the worm gear due to external force (for example, back drive as rotational load).

In addition, after external force (for example, back drive as rotational load) is reversely input to the end plate 90 through the final output gear 92, the same may overcome support force of the rotational force transmission pins 64 and may be transmitted to the cycloid inner gear 60. In this case as well, while the pair of wedges 70 is constantly opened by elastic restoring force of the spring 40, the same is compressed against the inner peripheral surface of the through hole 62 of the cycloid inner gear 60 so as to act as brake force to prevent rotation of the cycloid inner gear 60, thereby making it possible not only to fundamentally prevent external force from being transmitted to a cam gear, a worm wheel gear serving as a transmission gear, and a worm gear serving as an output gear, but also to prevent damage to the worm wheel gear and the worm gear due to external force.

As is apparent from the above description, the present device provides the following effects.

First, when a motor is driven, in addition to an output gear connected to an output shaft of the motor and a transmission gear, a pair of wedges, constantly opened by a cam having rotational force transmission protrusions formed thereon and elastic restoring force of a spring and constantly compressed against the inner peripheral surface of the through hole of a cycloid inner gear, is used to output rotational power of a speed reduction device, thereby making it possible to prevent occurrence of play and backlash between gears and components during rotational driving of the motor.

Second, even if external force (for example, back drive as rotational load) is reversely input to an end plate through a final output gear, some of the rotational force transmission pins of the cycloid inner gear restrain the clockwise rotation of the end plate, and the rest of the rotational force transmission pins restrain the counterclockwise rotation of the end plate, thereby making it possible to primarily prevent external force from being transmitted to a worm wheel gear serving as a transmission gear and a worm gear serving as an output gear. Accordingly, it is possible to prevent damage to the worm wheel gear and the worm gear.

Third, even if external force (for example, back drive as rotational load) is reversely input to the end plate through the final output gear and then transmitted to the cycloid inner gear, a pair of wedges secondarily acts as brake force to prevent rotation of the cycloid inner gear, thereby preventing play and backlash between components and preventing external force from being transmitted to a worm wheel gear serving as a transmission gear and a worm gear serving as an output gear. Accordingly, it is possible to prevent damage to the worm wheel gear and the worm gear.

Fourth, in a state in which rotational force of the final output gear of the speed reduction device is output to a swivel mechanism of a seat and seat swivel operation is performed, even if external force is input to the speed reduction device through the final output gear, it is possible to reliably prevent movement of the seat in the swivel-controlled state because there is neither play nor backlash between gears and components. As a result, it is possible to solve the conventional problem that an occupant seated on the seat feels uncomfortable due to unexpected movement of the seat.

Although preferred embodiments of the present device have been described in detail above, the scope of the present disclosure is not limited thereto, and those skilled in the art will appreciate that various modifications, additions, and substitutions are possible, without departing from the scope and spirit of the device as disclosed in the accompanying claims.

What is claimed is:

1. A speed reduction device for a motor, comprising:
   a transmission gear engaged with an output gear of a motor and disposed in a speed-reducing housing;
   a cam including a pair of rotational force transmission protrusions formed to protrude from an outer surface thereof, the cam being integrally mounted on an outer surface of the transmission gear;
   a ring gear formed on an outer surface of the housing;
   a cycloid inner gear including a through hole formed therein and a plurality of rotational force transmission pins formed thereon, the cycloid inner gear being engaged with the ring gear;
   a pair of wedges disposed in close contact with an inner peripheral surface of the through hole so as to respectively contact the pair of rotational force transmission protrusions entering the through hole;
   a spring configured to compress the pair of wedges against the inner peripheral surface of the through hole with elastic restoring force; and
   an end plate including a plurality of restraining holes formed therein and configured to allow the plurality of rotational force transmission pins to be respectively inserted thereinto so as to enable power transmission.

2. The speed reduction device of claim 1, wherein the output gear of the motor is embodied as a worm gear connected to an output shaft of the motor and located in the speed-reducing housing, and the transmission gear is embodied as a worm wheel gear engaged with the worm gear.

3. The speed reduction device of claim 1, wherein the through hole is formed in a center portion of the cycloid inner gear and the plurality of rotational force transmission pins are formed on an outer surface of the cycloid inner gear, and the cycloid inner gear is partially engaged with the ring gear while being eccentric with respect to the transmission gear.

4. The speed reduction device of claim 1, wherein the spring includes a broken-shape ring portion supported by the transmission gear and includes elastic support ends respectively bent in axial directions from opposite ends of the ring portion, the elastic support ends respectively compressing the pair of wedges against the inner peripheral surface of the through hole of the cycloid inner gear with the elastic restoring force.

5. The speed reduction device of claim 4, wherein the transmission gear includes a support jaw formed on an outer surface thereof, wherein the support jaw allows the ring portion of the spring to be wound therearound and supported thereby.

6. The speed reduction device of claim 4, wherein the wedges include restraining grooves respectively formed at opposite one ends thereof and configured to face each other so that the elastic support ends are respectively inserted into the restraining grooves and restrained therein, and each of the wedges gradually becomes thinner toward the other end thereof.

7. The speed reduction device of claim 1, further comprising a rotational support shaft including an inner end configured to pass through the through hole of the cycloid inner gear and a rotational center portion of the transmission gear and the cam, the inner end being rotatably engaged with the housing, the rotational support shaft further including an outer end configured to eccentrically pass through the through hole of the cycloid inner gear and formed to extend toward the end plate.

8. The speed reduction device of claim 7, wherein the transmission gear, the cam, and the end plate are coaxially arranged by the rotational support shaft, and the cycloid inner gear is engaged with the ring gear while the pair of wedges is in contact with and supported by the pair of rotational force transmission protrusions of the cam so as to be arranged eccentrically with respect to the transmission gear, the cam, and the end plate.

9. The speed reduction device of claim 1, wherein the plurality of rotational force transmission pins are integrally formed on an outer surface of the cycloid inner gear and spaced apart by circumferentially equal distances around the cycloid inner gear, and the plurality of restraining holes are formed to penetrate the end plate and are spaced apart by circumferentially equal distances around the end plate.

10. The speed reduction device of claim 9, wherein the end plate includes a final output gear mounted on an outer surface thereof, and wherein center portions of the end plate and the final output gear are rotatably inserted into and supported by a rotational support shaft.

11. The speed reduction device of claim 9, wherein an inner diameter of each of the restraining holes is formed to be larger than a cross-sectional diameter of each of the rotational force transmission pins of the cycloid inner gear.

12. The speed reduction device of claim 11, wherein, when the rotational force transmission pins of the cycloid inner gear are respectively inserted into the restraining holes of the end plate, some of the rotational force transmission pins are respectively in close contact with the inner peripheral surfaces of corresponding ones of the restraining holes in a direction of restraining clockwise rotation of the end plate, and rest of the rotational force transmission pins are respectively in close contact with the inner peripheral surfaces of corresponding ones of the restraining holes in a direction of restraining counterclockwise rotation of the end plate.

13. The speed reduction device of claim 10, further comprising a housing cover including an output hole formed therein and configured to allow the final output gear to protrude to an outside of the housing cover, the housing cover being fastened to the speed-reducing housing with the ring gear interposed therebetween.

* * * * *